United States Patent

[11] 3,581,202

| [72] | Inventors | Yves J. Pelenc<br>La Tronche;<br>Georges M. Bernard, Saint Egreve, both of, France |
|---|---|---|
| [21] | Appl. No. | 752,927 |
| [22] | Filed | Aug. 15, 1968 |
| [45] | Patented | May 25, 1971 |
| [73] | Assignee | Merlin Gerin, Societe Anonyme, Grenoble, France |
| [32] | Priority | Sept. 1, 1967 |
| [33] | | France |
| [31] | | 119,802 |

[54] DEVICES FOR THE ELECTRO-OPTICAL MEASUREMENT OF AN ELECTRICAL QUANTITY
3 Claims, 1 Drawing Fig.

[52] U.S. Cl. .................................................. 324/96
[51] Int. Cl. ........................................... G01r 19/08

[50] Field of Search ............................................ 324/96; 350/151

[56] References Cited
UNITED STATES PATENTS

| 3,324,393 | 6/1967 | Casey et al. ..................... | 324/96 |
| 3,413,055 | 11/1968 | De Sorbo ........................ | 324/96X |
| 3,196,739 | 7/1965 | Wenking et al. ................ | 350/151X |
| 3,473,031 | 10/1969 | White ............................. | |

*Primary Examiner*—Gerard R. Strecker
*Attorney*—Stevens, Davis, Miller & Mosher

ABSTRACT: Electro-optical measuring device for high-voltage overhead lines wherein a light beam is directed to the line and reflected to the earth surface and whereby both the upwardly directed light beam and the reflected light beam follow the same path and traverse the same measuring devices.

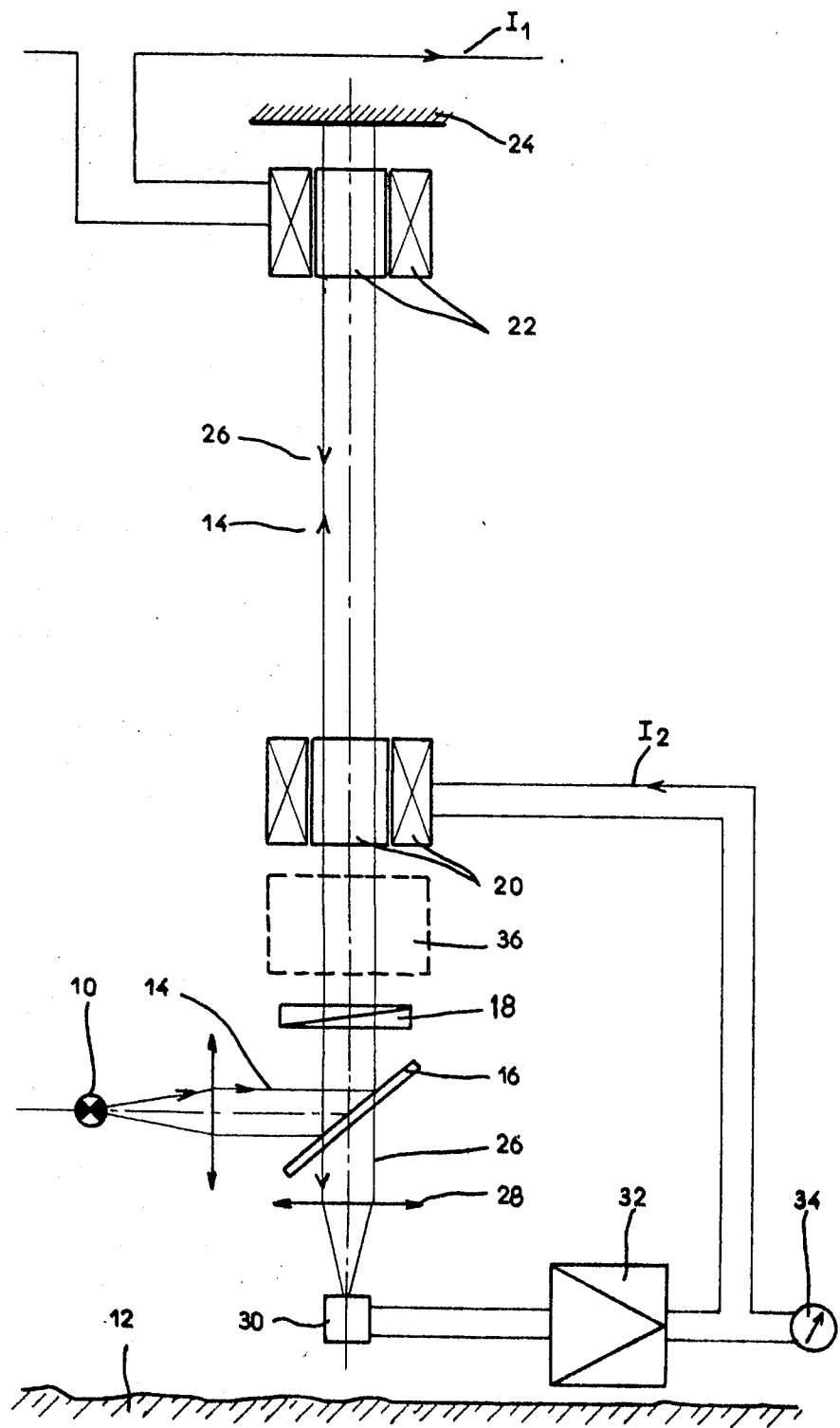

DEVICES FOR THE ELECTRO-OPTICAL MEASUREMENT OF AN ELECTRICAL QUANTITY

The present invention relates to electro-optical devices for measuring an electrical quantity which is associated with an overhead line of high voltage such as a high voltage power line in which at least one beam of light emitted by a source located in the vicinity of the ground or earth surface is directed towards the said overhead conductor so as to be modulated in a modulation device by the said electrical quantity and reflected towards the ground where a modulation detection device measures the said variable.

Devices of this type are known for measuring the voltage of a high voltage power line or the current travelling therein. Generally, a polarized beam of light is used which passes through a Faraday, Kerr, Cotton-Mouton or Pockels cell which modulates the polarized beam by rotation of its plane of polarization or, in general, by modification of the mode of polarization of the beam of light, as a function of the said electric quantity whether voltage or current. The degree of modulation is detected in the vicinity of the earth by a measuring device comprising a photodetector and preferably also an electro-optical compensation device. Devices of this kind are for instance described and shown in the French Pat. Nos. 1,439,260; 89,679/1,439,260; 1,484,684 and 1,484,686 as well as in the copending U.S. Pat. applications Ser. Nos. 541,629; 541,630; 622,275 and 622,276.

Customarily, the optical path of these devices is double, the forward path of the beam being different from and juxtaposed to the return path of the reflected beam, the measuring device being interposed either on one or the other path.

An object of the present invention is to simplify these devices and make them less expensive, easier to adjust, less space consuming and of increased sensitivity.

In the measuring device in accordance with the invention the upward and downward paths of each beam of light are merged at least in part between the earth and the said overhead conductor.

The device in accordance with the invention makes it possible to use a single light guide or hollow insulator for the upward and downward beams and even to do away with these guides and insulators for the passing upward and downward of the beams in the form of free beams, a suitable device such as an auto-collimator prism assuring the reflection of the beam.

Furthermore, the fact that the polarized light passes through the modulating and compensating or modulation detecting devices twice makes it possible to double the sensitivity of measurement.

The invention will now be explained by the description of the particular case of a Faraday-effect current transformer but it will be understood that it can be applied to other electrical-optical measuring devices which are enumerated in nonlimitative fashion above.

This transformer is shown schematically in elevation in the single FIGURE of the accompanying drawing. It is recalled that Faraday discovered that certain transparent isotropic bodies, liquids or solids, placed in a magnetic field, cause a rotation of the plane of polarization of a light beam which passes therethrough parallel to the direction of the magnetic field. The rotation is particularly great for bodies having a large refraction dispersion, such as flint glass. The rotation of the plane of polarization is proportional to the magnetic field created by a current flowing through a coil surrounding the transparent body.

In this FIGURE, a simple or multiple source of light 10 arranged in the vicinity of the ground or earth surface 12 and consisting of an incandescent lamp, a discharge lamp, a laser, etc., produces a beam of light 14. This beam 14 is reflected by a semireflective plate 16, passes through a polarizer 18, so as to be polarized, a Faraday compensation cell 20 excited by a secondary current $I_2$ and then through a Faraday modulation cell 22 excited by the current $I_1$ to be measured which is flowing in an overhead line (not shown) at high voltage, said modulation cell 22 rotating the plane of polarization of the light beam under the influence and as a function of the magnetic field produced by the current to be measured $I_1$. A mirror 24, an auto-collimation prism or a similar device reflects the upward beam 14 and the reflected beam 26 moves downward in accordance with the invention in such a manner that its path merges between the plate 16 and the mirror 24 with that of the upward beam 14. The downward beam 26 also passes through the cells 22 and 20 and the polarizer 18 which then serves as analyzer, whereby the cell 20 produces a rotation of the polarization plane of the light beam 26 substantially equal but of opposite direction to the rotation produced by cell 22. The beam 26 then passes through the semireflecting plate 16 and a focusing lens 28 and strikes against a photodetector device 30 which may consist of a simple photoelectric cell or of a photomultiplier. The photodetector 30 drives an amplifier 32 which produces the secondary current $I_2$ which excites the Faraday compensation cell 20.

A load 34 is traversed by the current $I_2$, and consists for instance of an ammeter which on a suitable scale indicates the current $I_1$ flowing in the overhead line. It will be noted that the modulation detecting device comprising cell 20 and the devices 18, 16, 28, 30, 32 and 34 is located in the vicinity of the ground and is practically at ground potential. The modulating cell 22 and the mirror 24 on the other hand are located in the vicinity of the high voltage line and they are therefore at a high potential. The forward and return beams 14 and 26 follow the same path in opposite directions between the plate 16 and the mirror 24 and pass through the space between the line and the ground either as free beams or guided in whole or in part by a light guide (not shown) or within a hollow insulator (not shown), such as a glass or plastic tube.

In the arrangement which has just been described, the polarizer 18 also serves as analyzer. Analyzer and polarizer then have their optical axes parallel. It may be advantageous to work with crossed axes, for instance with axes crossed at 45°. In such case, there is placed in the path of the polarized light a device 36 which causes a rotation equal to half of that which polarizers and analyzers must show between each other, for instance 22° 30′, the light which passes through the device 36 twice is turned 45° and the desired purpose is reached. This device 36 may be any desired device, for instance a Kerr or Faraday, Pockels or Cotton-Mouton cell, an active substance (sugar, quartz, solution of these substances), a quarter-wave or half-wave plate, etc., a suspension of colloidal iron in a resin, etc.

The relative arrangement of the photodetector 30 and the source 10 may be different and in particular their respective positions may be reversed. They can also occupy positions which are very close together, provided that suitable focusing devices are used. In this case, the plate 16 can be eliminated and the luminous efficiency greatly improved.

In the case of a plurality of sources, the plate 18 has multiple faces.

It should be recalled that the Faraday cells 20 and 22 can be replaced by any other electro-optical cell or groups of cells, such as a Kerr-effect, Pockels or Cotton-Mouton cell or group of cells, without thereby going beyond the scope of the invention.

The invention applies to the measurement of voltage, of current or of any other electrical quantity.

What is claimed is:

1. An electro-optical device for measuring an electrical quantity characteristic of an overhead high-voltage line, comprising: a light source disposed adjacent the earth surface, a light beam emitted by said source, optical means to direct said light beam towards said overhead line along a predetermined path, reflecting means disposed in the path of said light beam adjacent said overhead line to reflect said light beam substantially along said predetermined path towards said earth surface, polarizing means disposed in said predetermined path to be traversed by said transmitted and reflected light beams, modulating means disposed in the path of said light beam adjacent said overhead line between said polarizing means and said reflecting means to modulate said light beam as a function of said electric quantity, and modulation detecting means elaborating said reflected light beam adjacent said earth surface to detect the degree of modulation of said modulated light beam.

2. A device according to claim 1, wherein said modulating means comprises first electro-optical transducer means producing a rotation of the polarization plane of said transmitted light beam of an angular amount substantially proportional to the value of said electrical quantity, said modulation detecting means comprising second electro-optical transducer means disposed in said path adjacent said earth surface and traversed by said transmitted and reflected light beams to produce a compensating rotation of the polarization plane of said light beams of an angular amount substantially equal but opposed to the angular rotation of the polarization plane produced by said first transducer means.

3. A device according to claim 2, further comprising additional means disposed in said path between said polarizing means and said second transducer means to produce a rotation of the polarization plane of a predetermined angular amount of the transmitted and reflected light beams passing therethrough.